United States Patent
Chaturvedi et al.

(10) Patent No.: US 11,526,503 B2
(45) Date of Patent: *Dec. 13, 2022

(54) BUSINESS OPERATING SYSTEM ENGINE

(71) Applicant: Vantage Agora, Inc., Beachwood, OH (US)

(72) Inventors: Harsha Chaturvedi, Battle Creek, MI (US); Sudhir Achar, Concord, OH (US); Mehul Manilal Kenia, Broadview Heights, OH (US)

(73) Assignee: Vantage Agora, Inc., Beachwood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/088,753

(22) Filed: Nov. 4, 2020

(65) Prior Publication Data

US 2021/0049166 A1    Feb. 18, 2021

Related U.S. Application Data

(63) Continuation of application No. 16/513,227, filed on Jul. 16, 2019, now Pat. No. 10,860,575.

(Continued)

(51) Int. Cl.
*G06F 7/02* (2006.01)
*G06F 16/00* (2019.01)
(Continued)

(52) U.S. Cl.
CPC ........ *G06F 16/2423* (2019.01); *G06F 16/287* (2019.01); *G06F 40/205* (2020.01); *G06K 9/6262* (2013.01); *G06Q 10/0637* (2013.01)

(58) Field of Classification Search
CPC .......... G06Q 10/0639; G06Q 10/0637; G06Q 10/06375; G06Q 50/01; G06Q 10/08;
(Continued)

(56) References Cited

U.S. PATENT DOCUMENTS 9,563,613 B1    2/2017  Dinkel
11,120,057 B1*  9/2021  McNabney ........... G06F 16/316
(Continued)

FOREIGN PATENT DOCUMENTS

CN    101395601 B    1/2014

OTHER PUBLICATIONS

International Search Report from PCT/US19/42020 dated Sep. 5, 2019.

(Continued)

*Primary Examiner* — Bruce M Moser
(74) *Attorney, Agent, or Firm* — Calfee, Halter & Griswold LLP (57) ABSTRACT

An engine for resolving a query from a user to provide a dynamic actionable dashboard in a business operating system includes an MLET database, a data interface, a logic configured to process incoming queries, fetch data in relation to those queries, and render an actionable dashboard having data resulting from the queries. The MLET database comprises a plurality of templates ("MLETs"), each MLET being associated with a unique identifier and including a mechanism for accessing data relating to that identifier. The logic processes queries into constructs having a tokens and configurable inputs. If the query includes a unique identifier associated with an MLET in the MLET database, the MLET is used to fetch data responding to the query. If the query includes a unique identifier not associated with an MLET in the MLET database, the logic creates a new MLET using operational intelligence and stores it in the MLET database.

18 Claims, 6 Drawing Sheets

Related U.S. Application Data (60) Provisional application No. 62/699,430, filed on Jul. 17, 2018.

(51) Int. Cl.
*G06F 16/242* (2019.01)
*G06F 16/28* (2019.01)
*G06F 40/205* (2020.01)
*G06K 9/62* (2022.01)
*G06Q 10/06* (2012.01)

(58) Field of Classification Search
CPC .... G06F 16/2423; G06F 16/287; G06F 16/00; G06F 16/27; G06F 17/2705; G06F 40/205; G06K 9/6262; G10L 17/02
See application file for complete search history.

(56) References Cited

U.S. PATENT DOCUMENTS

| | | |
|---|---|---|
| 2006/0053096 A1 | 3/2006 | Subramanian |
| 2008/0162415 A1 | 7/2008 | Kaiser et al. |
| 2008/0319969 A1 | 12/2008 | Dertinger |
| 2014/0040306 A1 | 2/2014 | Gluzman et al. |
| 2015/0324423 A1 | 11/2015 | Wang |
| 2015/0379136 A1 | 12/2015 | Sogani |
| 2021/0026846 A1* | 1/2021 | Subramanya ........... G06F 16/36 |

OTHER PUBLICATIONS

Soldenshluger et al, "Woodroofs One-Armed Bandit Problem Revisited," Annals of Applied Probability, vol. 19 No. 4 p. 1603-1633, 2009. (Year: 2009).

* cited by examiner

BUSINESS OPERATING SYSTEM ENGINE

CROSS-REFERENCE TO RELATED APPLICATIONS

This application is a continuation of U.S. application Ser. No. 16/513,227, filed Jul. 16, 2019, which claims priority to and the benefit of U.S. Provisional Patent Application No. 62/699,430, filed Jul. 17, 2018, the entire contents of which are incorporated by reference herein.

BACKGROUND

The present disclosure generally relates to the field of business operating systems and specifically to an engine for resolving queries to provide a dynamic actionable dashboard in a business operating system.

To maintain a competitive advantage, businesses are constantly migrating their operations to new and improved technologies. Often, businesses use multiple systems for different tasks and operations. These systems, however, lack integration and cohesion, which greatly reduces efficiency, a prevent businesses from reaching peak operational excellence. While attempts have been made to create business operating systems that provide control and coordination over disparate systems, current systems suffer from many drawbacks. For example, existing business operating systems fail to provide visibility and control over the strategies executed by employees, instead providing only an overview of performance, based on key result areas at an organizational level. Accordingly, most executives spend their time analyzing and addressing business challenges without identifying the root causes for failing to meet business goals. Specifically, these business operating systems lack operational intelligence, and without operational intelligence, executives find it difficult to correlate between the executed strategies and the strategies of the organization that lead to operational excellence and efficiency.

Furthermore, existing business operating systems require developers to update the framework if any changes related to the goals, targets, employees, roles, and strategies, are made in the organization. These changes to the framework of the business operating system are iterative and redundant, resulting in inefficient consumption of time and resources. For example, in existing systems, to add a new data model to the system requires a data team to convert the model to software, to test it and to obtain user acceptance. This process often takes three or more weeks to complete and must be repeated for each new change. This software development latency proves untenable in fast-paced business environments.

Accordingly, there is a need for a business operating system that facilitates achieving operational excellence and efficiency by providing enterprise-wide visibility and control over the executed strategies. There is a need for a business operating system that helps an organization adapt to changes in real time. Furthermore, there is a need for a business operating system that does not require developers to update the framework when changes are made to the organizational hierarchy, goals, targets, employees, roles or strategies of the organization.

SUMMARY

According to an embodiment, an engine for resolving a query from a user to provide a dynamic actionable dashboard in a business operating system includes an MLET database, a data interface, a logic configured to process incoming queries, fetch data in relation to those queries, and render an actionable dashboard having data resulting from the queries. The MLET database comprises a plurality of templates (each an "MLET"), each MLET being associated with a unique identifier and including a mechanism for accessing data relating to that identifier. The logic processes incoming queries by parsing the query to create an MLET construct having a token denoting that that the construct is an MLET construct and configurable inputs. The logic further interprets the parsed query to determine whether it includes a unique identifier associated with an MLET in the MLET database. If the query includes a unique identifier associated with an MLET in the MLET database, the logic uses the MLET in the MLET database to fetch data responding to the query. If the query includes a unique identifier not associated with an MLET in the MLET database, the logic creates a new MLET associated with the unique identifier using operational intelligence and stores the new MLET in the MLET database.

According to another embodiment, a method for resolving a query from a user to provide a dynamic actionable dashboard in a business operating system includes parsing the query to create a template ("MLET") construct having a token denoting that that the construct is an MLET construct and configurable inputs and interpreting the parsed query to determine whether it includes a unique identifier associated with an MLET in a database of MLETs. If the query includes a unique identifier associated with an MLET in the MLET database, the method uses the MLET in the MLET database to fetch data responding to the query. If the query includes a unique identifier not associated with an MLET in the MLET database, the method creates a new MLET associated with the unique identifier using operational intelligence and stores the new MLET in the MLET database. The method renders an actionable dashboard containing the fetched data.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

Figure 1:
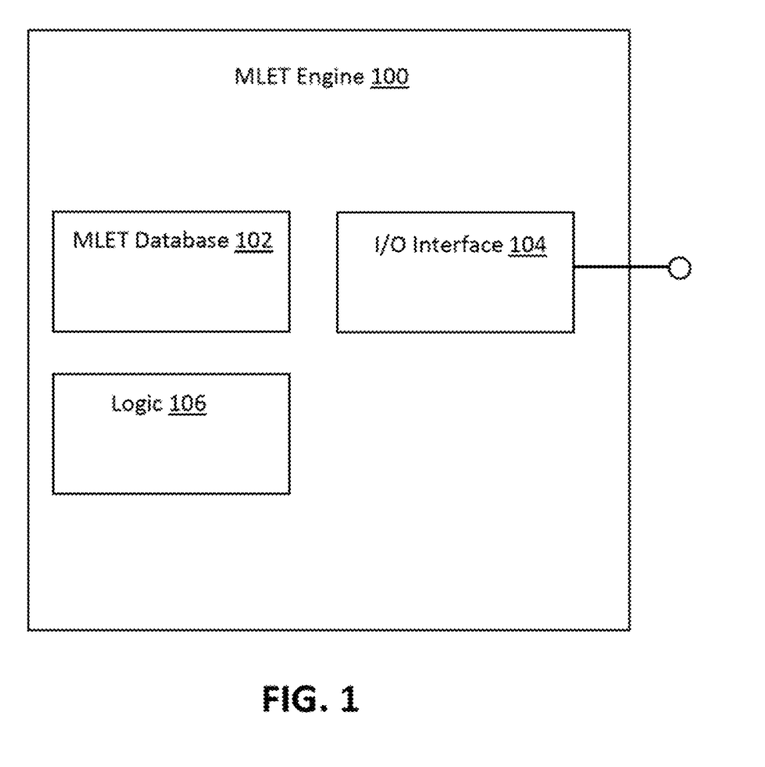
FIG. 1 is schematic diagram of an exemplary MLET engine.

The present application discloses systems and methods relating to an engine for resolving queries to provide a dynamic actionable dashboard in a business operating system. An exemplary business operating system capable of using the presently disclosed system and method is disclosed in U.S. Patent Application Publication No. 2017/0213169 A1 entitled "Social Networking System for Organizational Management," which is incorporated by reference in its entirety herein. The present system and method includes a specific "no-developer-needed" ("NDN") language framework and engine that allows non-technical user to quickly make the same type of organizational changes to a business operating system that would typically require a team of data experts several weeks to complete. For purposes of this disclosure, the novel engine is referred to a matrixLET ("MLET") engine. Components of an exemplary MLET engine 100 are depicted in FIG. 1.

The exemplary MLET engine includes an MLET database 102. As described in more detail below, the MLET database 102 stores a set of MLETs, which are essentially templates having an identifier or acronym defining the MLET, and a mechanism for accessing data associated with that acronym. For example, the MLET may contain a subroutine, such as a webhook, that is configured to fetch data from databases associated with the MLET. In another example, the MLET may include structure query language (SQL) code for accessing a one or more big data or structured data sources. In some embodiments, the MLET database also includes HTML data associated with each MLET that can be quickly returned by the MLET engine for queries relating to certain MLETS.

The exemplary MLET engine 100 also includes an input/output interface 104. The input/output interface 104 serves at least three important functions. First, the input/output interface 104 connects with a business operating system or other program to accept queries from a user as described below. The interface 104 for this purpose may take the form of an application programming interface ("API"), and the connection between the MLET engine 100 and the software providing the query may be a local or remote connection, e.g., over the Internet. The input/output interface 104 also may connect with external databases to fetch data in response to queries. For example, the interface 104 may be an Open Database Connectivity ("ODBC") connection and may be connected to databases on the same physical machine as the MLET engine 100, on a different machine on the same local network, or at remote locations. Finally, the input/output interface 104 connects to with the business operating system or other software to provide result that can be posted to an actionable dashboard or some other display. The results may be provided through the same or a different API as used for the queries.

The exemplary MLET engine 100 also includes a logic 106. The logic 106 may be stored in local or remote memory and used to process incoming queries, fetch data in relation to those queries, and provide results. A detailed explanation of the algorithms that that drive the logic 106 follows in the flowcharts of FIGS. 2 and 4.

Figure 2:
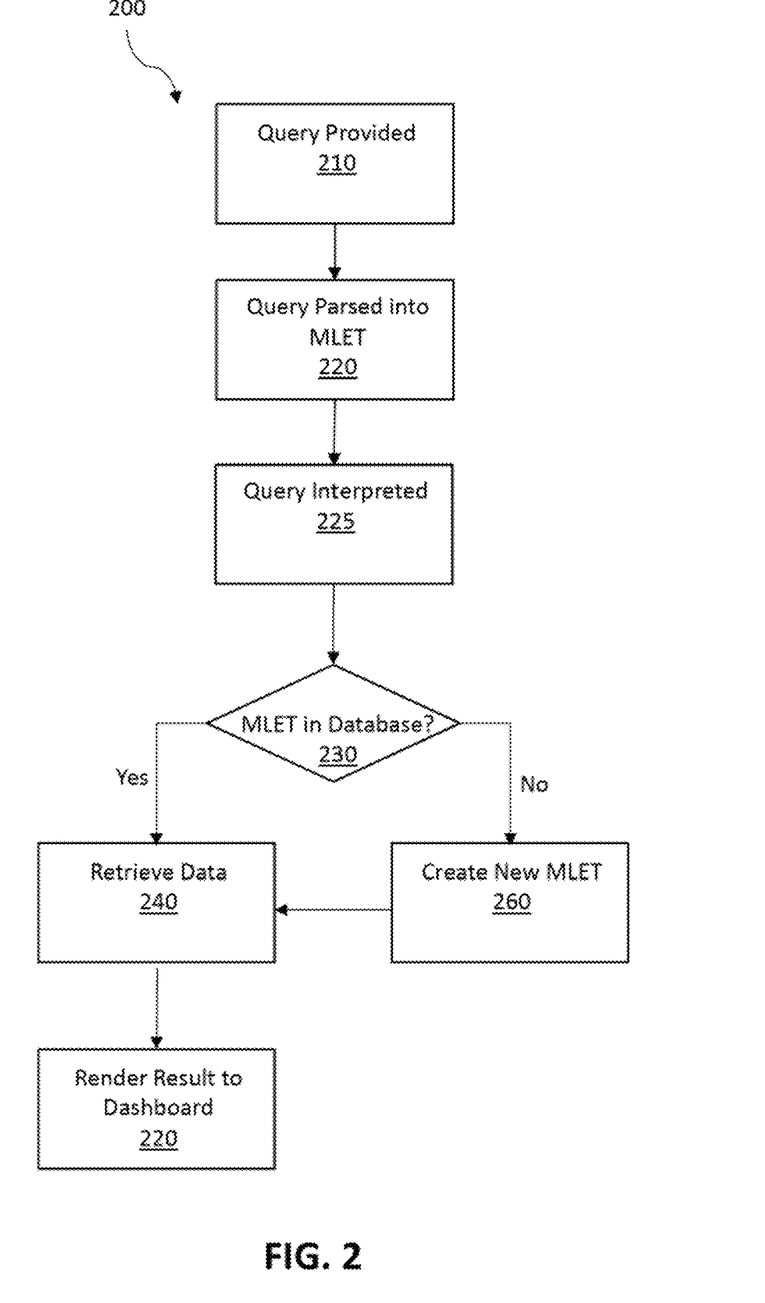
FIG. 2 is a flowchart for an exemplary MLET engine logic.
Figure 3:
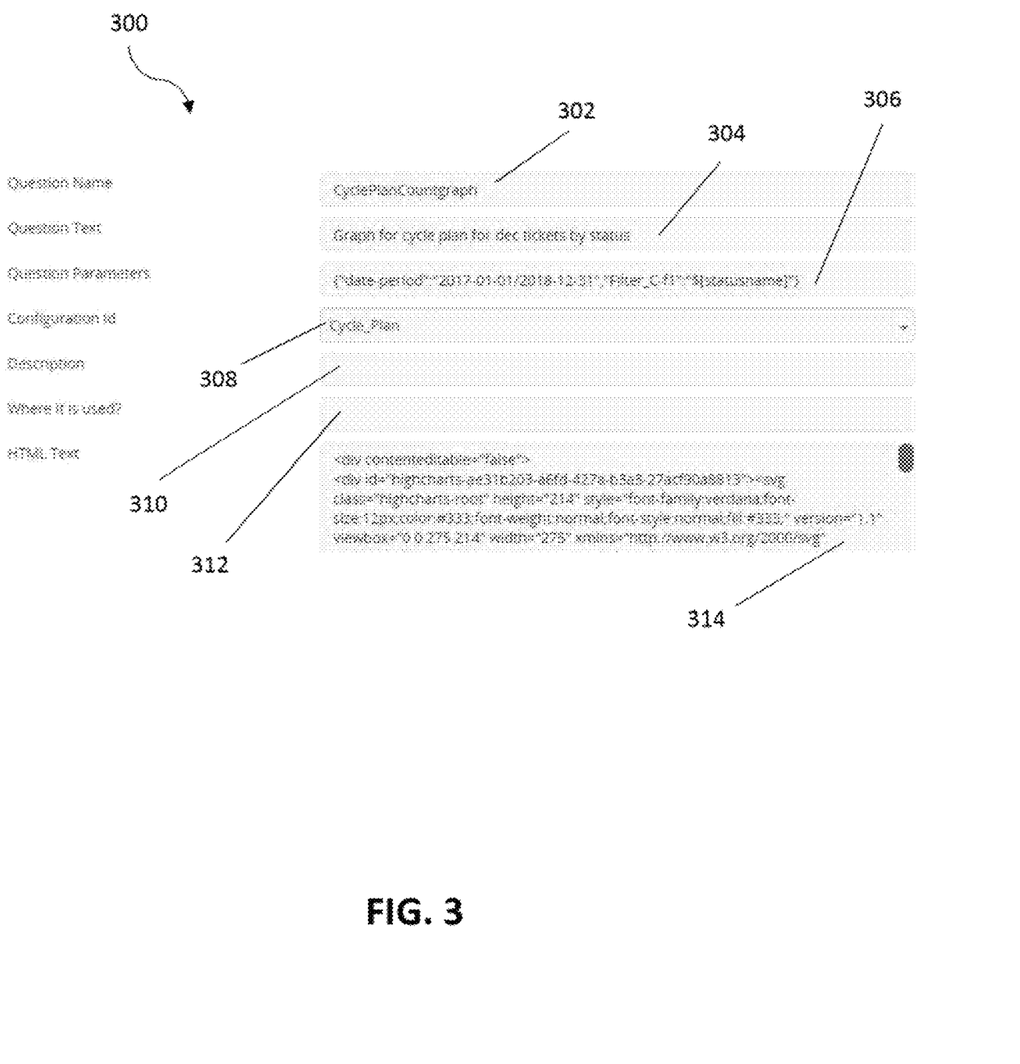
FIG. 3 is a screenshot of an exemplary query entry form.

FIG. 2 depicts an overview of a method for processing quires to update an actionable dashboard. At step 210, a user enters a plain text query. An exemplary form for entering a plain text query is shown in FIG. 3. The form 300 includes a query name field 302 for naming the query. The query name field 302 is allows a user (or another user) to easily recall the query at a later time and provides an identifier for an MLET. The form 300 further includes a query text field 304, wherein a user enters a plain text query. In the exemplary form 300, a user has queried for a graph of a cycle plan for decision tickets by status. The form 300 also includes a parameters field 306, where by a user can enter any number of parameters to be considered with the query. For example, the exemplary form 300 lists a date period, a data filter and an XREF (discussed later). Possible other parameters include, for example, the type of display required for the result (e.g., a chart or graph). The form 300 also includes a Configuration ID field 308 wherein a user can select a unique number for the saved MLET that assists the system in listing possible MLETs for a next subsequent use. The form 300 additionally includes fields for identifying and grouping the query, such as the description field 310 and "where is it used?" field 312. The exemplary form 300 further includes an HTML Text field 314 to allow the formatting of the information being output from the MLET. Pre-supplied HTML formatting ensures that the result of an MLET query is formatted and presented in a way that makes sense to the user, and also allows for faster retrieval of results, as explained further below. In the form 300, the HTML Text field 314 includes code to create a chart using the data.

FIG. 3 is only one exemplary way of submitting a query. It is also contemplated that a user can submit a query using a voice/speech-interface, a chat interface, or a different graphical user interface on a mobile device or personal computer.

Returning to FIG. 2, as step 220, the system parses the query into an MLET construct with a token. For example, if a user submitted the query "what are the profits made by the organization from a Client XYZ in the month of November," the system would parse the query into $[MLET! Profits! CONFIG: Client: XYZ CONFIG: Month: November!], where "$[" is the token, "Profits" is the MLET, and "client" and "month" are configurable inputs. The token helps the MLET engine parse the contents of the construct to perform operations in accordance with the identified MLET. In any document when the system sees the token, it knows that the following text is an MLET statement. The system will parse everything until the "]" and use the parsed text for the MLET query. The configurable inputs filter and/or narrow the scope of the query.

At step 225, the system uses artificial intelligence (e.g., machine learning) to make interpretations of the parsed query. There is no way to list or store all possible user queries, so instead, when there are gaps in the reference data for interpreting the queries, the system will decipher a right answer to the question based on a set of high level factors. Such factors include, for example: (1) The user's role, position and/or access permissions, (2) the user's department, (3) the user's location and/or time-zone, (4) the user's historical query trends, (5) queries of other users similar to the user, and/or (6) trending queries across all users. In one embodiment, the machine learning utilizes an algorithm designed to solve the multi-armed bandit problem, for example the epsilon-greedy strategy, epsilon-first strategy or epsilon-decreasing strategy. Other neural networks might be tried to determine a good fit for predicting the results based on the questions asked. If the system is still unable to interpret the query, it may send a message to the user stating the it was unable to parse the query and/or requesting further clarification.

In step 230, the MLET engine determines whether the MLET parsed in step 220 and interpreted in step 225 is present in the MLET database. If the MLET engine determines that the MLET is not in the MLET database, then the MLET engine creates a new MLET. The new MLET will be associated with data using operational intelligence. For example, in a case where "profit" is not in the MLET database (or training data), but "gross margin" is, the system will map profit to be the same as gross margin, and use the same MLET. If the system is not able to make this determination, it will request the user or an administrator to make that connection manually in the system. Accordingly, the system becomes increasingly intelligent about an organization over time. The process for creating new MLETs is described in more detail below.

Figure 4:
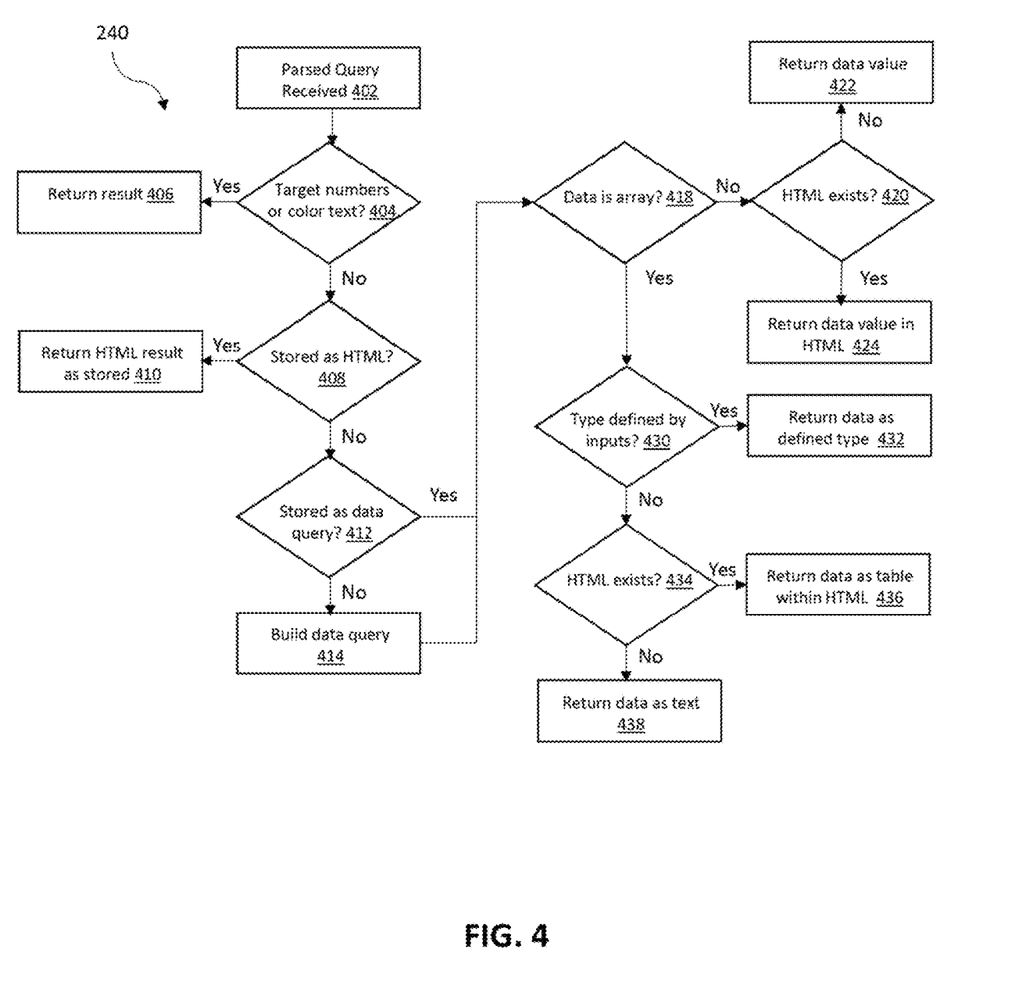
FIG. 4 is a flowchart of an exemplary logic for retrieving data via the MLET engine.

If the MLET engine determines that the MLET parsed in step 220 is in the MLET database, then method proceeds to step 240, where it retrieves data corresponding to the MLET and configurable inputs parsed from the query. In one embodiment, for example, the MLET calls a subroutine, such as a webhook, to retrieve the data from one or more databases. FIG. 4 illustrates exemplary aspects if step 240 in greater detail, at step 402, the parsed query is submitted to the MLET engine. At step 404, the MLET engine queries the MLET database to determine whether the MLET exists in the MLET database. At step 404, the MLET engine determines whether the configurable inputs are service level agreement target numbers or color text. If so, the engine proceeds to step 406, where it immediately returns the associated data. This allows the system to save time by avoiding use of AI resources for queries that have already been determined in the past.

If the configurable inputs are not service level agreement target numbers or color text, then the engine proceeds to step 408, where it determines, based on the MLET, whether the data sought is stored as HTML (or HTM) in the MLET database, or whether the engine needs to query another data source for the data. If the data is stored as HTML (or HTM) in the MLET database, for example, in an HTML column, then the engine proceeds to step 410, where it returns the HTML result as stored. For example, an MLET may be provided with pre-stored HTML as explained above with reference to FIG. 3.

If the data is not stored as HTML in the MLET database, the MLET engine proceeds to step 412, where it determines whether a data query is stored with the MLET. The query data is a mapping of the terms of the query that allows the query to run without further interpretation even if different parameters and filters are used in the query compared to previous queries. If a data query is stored with the MLET, then that query is called and the MLET engine proceeds to step 420. If a data query is not stored, then the MLET engine proceeds to step 414, where it builds a query. The system keeps a list of query configuration codes (i.e. mappings) stored in the MLET database 102 that may be learned, through use of the system, or pre-stored. The system uses these mappings to build an appropriate query based on the question presented by the user. The query may be directed to one or more data sources, for example, a business operating system database or a timesheet.

At step 418, based on the query submitted from either step 412 or 414, it is determined whether the data sought is in the form of a data array of not. If the data is not in the form of a data array, then the MLET engine proceeds to step 420, where it determines whether an HTML column exists at the data source for the sought data. If an HTML column does not exist, then, at step 422, the value for the data stored in the database is returned. If an HTML column does exist, then at step 424 the value for the data stored in the database is inserted into a placeholder of the HTML column, the combined HTML is returned.

At step 430, if the data sought is a data array, then the MLET determines whether one of the configurable inputs of the original query was a defined chart type, such as a pie chart, bar chart, histogram, line graph, area chart, etc. If the query included a defined chart type, then at step 432, the MLET engine returns the data array in a chart of the requested type. If the query did not include a defined chart type, then the MLET engine proceeds to step 434, where it determines whether an HTML column exists at the data source for the sought data array. If an HTML column does exist, then at step 436, the data array is returned as a table within the stored HTML. If an HTML column does not exist, then, at step 438, the data is returned as text. The text may be returned using, for example JavaScript Object Notation ("JSON"), and may include chart data using JavaScript charts such as AMChart or HighChart.

Figure 5:
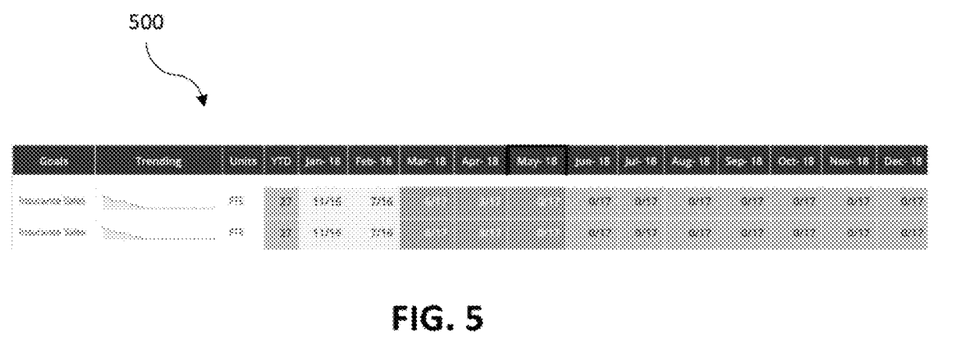
FIG. 5 is a screenshot of an exemplary dynamic actionable dashboard according to the disclosure.

At step 250, the retrieved data is rendered to an actionable dashboard. In one embodiment, the actionable dashboard is an "XFLAT." And XFLAT is an MLET type that represents information in the form of an annual plan versus actual achievements. This can be represented as monthly or quarterly numbers. An exemplary XFLAT 500 is depicted in FIG. 5.

In one embodiment, the system further includes special type of MLET called an XREF. The XREF, which can be called using the format $[XREF], does not get data from a database but from other forms or files of the business. For example, a company may have created a mission statement that is used repeatedly throughout different reports and materials. If the statement needs to be changed, rather than having to change each instance separately, with XREF it can be change in one place, and that change will propagate to all files that call the $[XREF].

Figure 6:
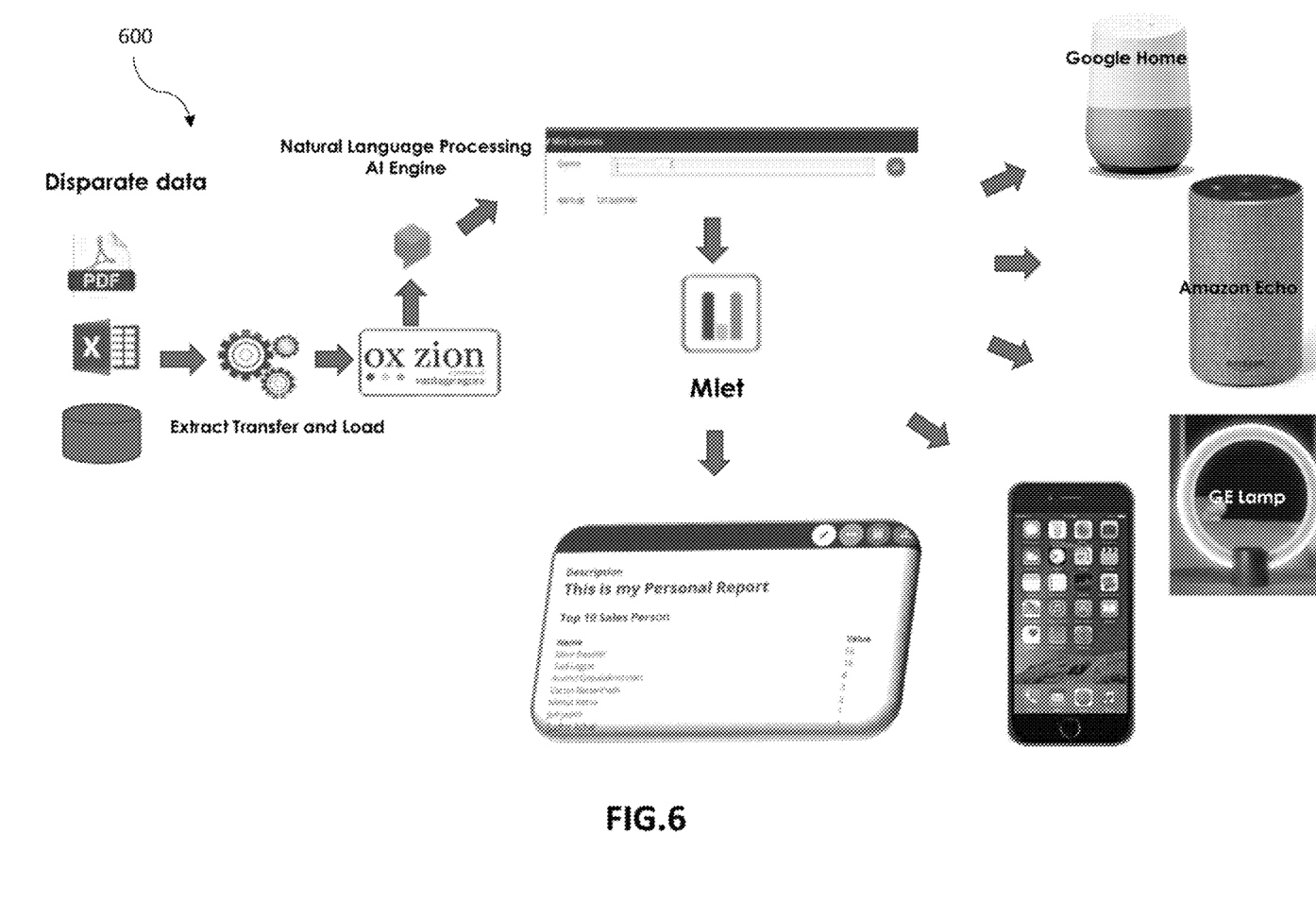
FIG. 6 is an exemplary business system utilizing the exemplary MLET engine disclosed herein.

FIG. 6 depicts an exemplary business system 600 that utilizes the disclosed systems and methods to integrate with a business operating system. In the exemplary system 600, the business operating system OX Zion is provided with a data from a set of disparate sources (e.g., databases, spreadsheets, text files and/or postscript documents). The data is fed to the business operating system through an ETL (extract, transfer and load) interface. The query and MLET systems and methods described above are then used to obtain meaningful results from the data.

As illustrated in FIG. 6, output data may be provided in many different forms. For example, based on the results returned and the key responsibility area and the SLA of the measure being reviewed by the MLET question, the results can be processed by the business operating system to trigger or modify a specific set of tasks. Tasks can be to automatically assign, remove, or modify, in relation to various departments and employees within a department of an organization. By way of example, if the business operating system determines from a query result that certain high-priority goals are not being met in one department, while another department has excess resources, the system can reassign those tasks to optimize business efficiency. This process helps ensure that the organization goals are met.

While the above disclosure focuses mainly on display of results, e.g., through a visual interface of a business operating system, it is further contemplating that MLET query results can be pushed to any device remotely connected to the business operating system, including the Internet of Things. Exemplary device that can be controlled by MLET results through a business operating system include smart speakers, smart lamps, virtual assistants, mobile devices, cameras, utilities, appliances, and more.

Some of the steps, acts, and other processes and portions of processes are described herein as being done "automatically." In the alternative, or in addition thereto, those steps, acts, and other processes and portions of processes can be done with one or more intervening human acts or other manual acts that eventually trigger the mentioned step(s), act(s), and/or other process(es) and/or process portion(s).

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. Accordingly, departures may be made from such details without departing from the spirit or scope of the applicant's general inventive concept.

What is claimed is:

1. An engine for resolving a query from a user to provide a dynamic actionable dashboard in a business operating system, comprising:
   an MLET database;
   a data interface; and
   a logic configured to process incoming queries, fetch data in relation to those queries, and render an actionable dashboard having data resulting from the queries,
   wherein the MLET database comprises a plurality of templates (each an "MLET"), each MLET being associated with a unique identifier and including a mechanism for accessing data relating to that identifier, and
   wherein the logic processes incoming queries by
      parsing the query to create an MLET construct having:
         a token denoting that the construct is an MLET construct, and configurable inputs,
      interpreting the parsed query to determine whether it includes a unique identifier associated with an MLET in the MLET database,
      if the query includes a unique identifier associated with an MLET in the MLET database, using the MLET in the MLET database to fetch data responding to the query,
      if the query includes a unique identifier not associated with an MLET in the MLET database, creating a new MLET associated with the unique identifier using operational intelligence and storing the new MLET in the MLET database, and;
      determining whether the data sought by the query is markup language data and, if so, returning the markup language data as stored.

2. The engine of claim 1, wherein the interpreting the parsed query is performed using machine learning based on one of (1) the user's business role, (2) the user's business department, (3) the user's location (4) the user's historical query trends, (5) queries of other users similar to the user, and (6) trending queries across all users to determine.

3. The engine of claim 1, wherein the interpreting the parsed query is performed using a one-armed bandit problem algorithm.

4. The engine of claim 1, wherein if the configurable inputs comprise a service level agreement, the engine immediately returns data associated with the service level agreement.

5. The engine of claim 1, wherein if the configurable inputs comprise color text, the engine immediately returns data associated with the color text.

6. The engine of claim 1, wherein if the MLET includes a data query, the data query is used to fetch resulting data.

7. The engine of claim 1, wherein if the MLET does not include a data query, the engine builds a data query based on pre-stored mappings and uses the built data query to fetch resulting data.

8. The engine of claim 1, wherein the logic fetching data comprises determining whether the data sought by the query is markup language data and, if not, returning the data as text.

9. The engine of claim 1, wherein the actionable dashboard depicts comparison of an annual plan and actual achievement.

10. The method of claim 1, wherein the actionable dashboard depicts comparison of an annual plan and actual achievement.

11. A method for resolving a query from a user to provide a dynamic actionable dashboard in a business operating system, comprising:
    parsing the query to create a template ("MLET") construct having a token denoting that the construct is an MLET construct, and configurable inputs;
    interpreting the parsed query to determine whether it includes a unique identifier associated with an MLET in a database of MLETs;
    if the query includes a unique identifier associated with an MLET in the MLET database, using the MLET in the MLET database to fetch data responding to the query;
    if the query includes a unique identifier not associated with an MLET in the MLET database, creating a new MLET associated with the unique identifier using operational intelligence and storing the new MLET in the MLET database;
    determining whether the data sought by the query is markup language data and, if so, returning the markup language data as stored; and
    rendering an actionable dashboard containing the fetched data.

12. The method of claim 11, wherein the interpreting the parsed query is performed using machine learning based on one of (1) the user's business role, (2) the user's business department, (3) the user's location (4) the user's historical query trends, (5) queries of other users similar to the user, and (6) trending queries across all users to determine.

13. The method of claim 11, wherein the interpreting the parsed query is performed using a multi-armed bandit algorithm.

14. The method of claim 11, wherein if the configurable inputs comprise a service level agreement, the method immediately returns data associated with the service level agreement.

15. The method of claim 11, wherein if the configurable inputs comprise color text, the method immediately returns data associated with the color text.

16. The method of claim 11, wherein if the MLET includes a data query, the data query is used to fetch resulting data.

17. The method of claim 11, wherein if the MLET does not include a data query, the method further comprises building a data query based on pre-stored mappings and using the built data query to fetch resulting data.

18. The method of claim 11, wherein the fetching data comprises determining whether the data sought by the query is markup language data and, if not, returning the data as text.

* * * * *